(12) United States Patent
Lomet

(10) Patent No.: US 7,904,427 B2
(45) Date of Patent: Mar. 8, 2011

(54) LAZIER TIMESTAMPING IN A TRANSACTION TIME DATABASE

(75) Inventor: David B. Lomet, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 419 days.

(21) Appl. No.: 12/013,389

(22) Filed: Jan. 11, 2008

(65) Prior Publication Data

US 2009/0182783 A1 Jul. 16, 2009

(51) Int. Cl.
*G06F 17/30* (2006.01)
(52) U.S. Cl. ......................................... 707/674
(58) Field of Classification Search ................ 707/648, 707/649, 999.206
See application file for complete search history.

(56) References Cited

U.S. PATENT DOCUMENTS

| | | | |
|---|---|---|---|
| 5,701,480 A | 12/1997 | Raz | |
| 5,864,849 A * | 1/1999 | Bohannon et al. .................... | 1/1 |
| 6,502,095 B2 | 12/2002 | Breitbart et al. | |
| 6,754,657 B2 | 6/2004 | Lomet | |
| 7,158,991 B2 | 1/2007 | Kekre et al. | |
| 7,243,088 B2 | 7/2007 | Verma et al. | |
| 7,281,023 B2 | 10/2007 | Lou | |
| 7,403,945 B2 * | 7/2008 | Lin et al. .............................. | 1/1 |
| 2006/0167960 A1 | 7/2006 | Lomet | |

OTHER PUBLICATIONS

David Lomet, et al. "Transaction Time Support Inside a Database Engine" http://www-users.cs.umn.edu/~mokbel/ImmortalDB-ICDE6.pdf. 12 pages.
Kjetil Norvag, et al. "The Vagabond Approach to Logging and Recovering in Transaction-Time Temporal Object Database Systems". Department of Computer and Information Science, Norwigian University of Science and Technonogy. 7494 Trondheim, Norway. 22 pages.
Kristian Torp, et al. "Correct and Efficent Timestamping of Temporal Data". Mar. 11, 1997. 22 pages.
David Lomet, et al. "Immortal DB: Transaction Time Support for SQL Server". http://www-users.cs.umn.edu/~mokbel/Immortal/DBDemo.pdf. 3 pages.

* cited by examiner

*Primary Examiner* — Vincent Boccio
*Assistant Examiner* — Jorge A Casanova
(74) *Attorney, Agent, or Firm* — Lee & Hayes, PLLC

(57) ABSTRACT

Systems and methods for facilitating more efficient timestamping in a lazy timestamping transaction time database environment are described herein. A recovery log component can store timestamp information of a transaction in a commit record of the transaction, wherein the commit record of the transaction is included in a recovery log. A volatile reference count component can update reference count data of the transaction in a volatile timestamp table to reflect a number of records of the transaction that do not persistently include timestamp information. Further, a checkpoint component can update timestamp information for a batch of transactions, wherein the timestamp information is updated in a record of the persistent timestamp table to ensure that the timestamp information persists in the record of the persistent timestamp table before the commit record of the transaction that contains the transaction's timestamp information is deleted from the recovery log.

19 Claims, 13 Drawing Sheets

LAZIER TIMESTAMPING IN A TRANSACTION TIME DATABASE

TECHNICAL FIELD

This disclosure relates generally to databases, and in particular, but not exclusively, relates to lazier timestamping in a transaction time database.

BACKGROUND

A transaction-time database enables users to inquire about the state of data contained in the database over a period of time—each data element (or record) in such a database is associated with a timestamp. To this end, it is important to maintain the serialization order of transactions contained in such a database, so that users can make database queries using user-sensible time values. For example, if a transaction A serialized earlier than a transaction B, then the timestamp of transaction A and records associated with transaction A must be less then the timestamp of transaction B and data associated with transaction B.

One problem with timestamping records related to a transaction of a transaction-time database is that the transaction's timestamp is usually unknown when the transaction is updating a record. Therefore, in order to ensure that all records updated by a transaction have been timestamped consistently with the serialization order of the transaction, conventional techniques select timestamps for records lazily, i.e., as late as possible in the execution of the transaction. Ideally, conventional techniques lazily select a timestamp when a transaction commits (i.e., when the transaction has completed and is persistent (e.g., saved to disk)). In this case, such techniques select the time of commit as the timestamp associated with the committed transaction.

In order to ensure that all records updated by a transaction have been timestamped after the transaction commits, timestamp information for the transaction must be made persistent until all records of the transaction have been timestamped. To this end, conventional techniques utilize a persistent transaction identifier (ID) timestamp table, which maps an ID of a transaction to a timestamp of the transaction. First, a transaction ID is assigned to a transaction when the transaction begins. Second, the transaction ID is stored in a field of a record the transaction is updating—this field will eventually be used to store a timestamp.

Third, the transaction ID is stored in a transaction ID timestamp table, usually at the time the transaction commits and when the time for its timestamp is known. Once the transaction commits, a transaction ID is mapped to the timestamp utilizing the transaction ID timestamp table. Fourth, in a subsequent transaction that accesses the record previously modified and lacking timestamp information, the record's field, previously containing a transaction ID, is replaced with the timestamp retrieved from the transaction ID timestamp table (where the transaction ID was mapped to the timestamp). Finally, once all records of the transaction have been updated with the timestamp of the transaction, information about the transaction can be deleted (garbage collected) from the transaction ID timestamp table.

One concern with conventional techniques that lazily select timestamps is that updating a persistent transaction ID timestamp table during every transaction can consume a large percentage overhead, especially during short transactions with only one or few updates. Another concern with conventional techniques that lazily select timestamps is the cost of maintaining a persistent transaction ID timestamp table—adding/removing elements to/from a persistent transaction ID timestamp table consumes valuable processing resources. Yet another concern with conventional techniques that lazily select timestamps is efficiently guaranteeing that all records of a transaction have been stored (e.g., written to disk) before information related to the transaction is deleted from a persistent transaction ID timestamp table. Low cost lazy timestamping methods do not treat timestamping as a recoverable update activity, so ensuring that the timestamped records are durable (persistent), should the system crash, needs to be guaranteed in some way that does not require a recovery log.

It is therefore desirable to have timestamping systems and methods that (1) decrease the timestamping cost, especially during short transactions, to update the transaction ID timestamp table; (2) decrease the cost of maintaining a persistent transaction ID timestamp table; and (3) efficiently guarantee in a very prompt and timely manner that all timestamped records of a transaction have been stored durably before information related to the transaction is deleted from a persistent transaction ID timestamp table.

SUMMARY

The claimed subject matter relates to systems and methods for facilitating more efficient timestamping in a lazy timestamping transaction environment. Currently used techniques that lazily select a timestamp for transactions are limited by overhead consumed during short update transactions that also update a persistent transaction ID timestamp table. Further, current technology is limited by costs associated with maintaining a persistent transaction ID timestamp table. Moreover, current lazy timestamp methods do not, in an efficient and timely manner, guarantee that all records of a transaction have been durably stored, so that it is possible to reduce the cost of maintaining a persistent transaction ID timestamp table.

Compared to current lazy timestamping technology, the novel systems and methods of the claimed subject matter decrease overhead consumed during update transactions by not requiring that a transaction ID timestamp table be updated as part of the update transactions. Rather, the mapping between transaction ID and timestamp is stored (temporarily) in the commit record for the transaction on the recovery log. Further, the cost of maintaining a persistent timestamp table is reduced because the persistent timestamp table can be periodically updated in a batch during a checkpointing process.

In addition, the systems and methods of the claimed subject matter further reduce costs associated with maintaining a persistent timestamp table by limiting updates to the persistent timestamp table to only those transactions whose timestamping is incomplete at a time when the checkpoint process removes their commit log record from the active recovery log. Further, the novel systems and methods of the claimed subject matter efficiently determine when timestamped records of a transaction have been stored persistently and are able, as early as possible, to efficiently determine when all records of a transaction have been so timestamped and stored, so that the transaction ID timestamp information for the transaction frequently need not ever be stored in the transaction ID timestamp table.

The following presents a simplified summary of the innovation in order to provide a basic understanding of some aspects described herein. This summary is not an extensive overview of the disclosed subject matter. It is intended to neither identify key or critical elements of the disclosed subject matter nor delineate the scope of the subject innovation. Its sole purpose is to present some concepts of the disclosed subject matter in a simplified form as a prelude to the more detailed description that is presented later.

The subject invention provides systems and methods for facilitating more efficient timestamping in a lazy timestamping transaction time database environment. In accordance with one aspect of the disclosed subject matter, a recovery log component can store timestamp information of a transaction and a reference count of records updated in a commit record of the transaction, wherein the commit record of the transaction is included in a recovery log, so that after a database system crash, the recovery component can restore this mapping by rebuilding a volatile timestamp table. A volatile reference count component can update reference count data of the transaction in a volatile timestamp table to reflect a number of records of the transaction that do not persistently include timestamp information. Further, a checkpoint component can update timestamp information for a batch of transactions, wherein the timestamp information is updated in a record of the persistent timestamp table to ensure that the timestamp information and reference count persists in the record of the persistent timestamp table before the timestamp information in the commit record of the transaction included in the recovery log is removed from the recovery log by the checkpoint component as it truncates the recovery log.

In accordance with another aspect of the disclosed subject matter, the volatile reference count component can map the reference count data of the transaction, which identifies how many records updated by a transaction are not yet persistently timestamped, to the identification of the transaction and the timestamp of the transaction in the volatile timestamp table. The volatile reference component can increment the reference count data of the transaction to reflect a number of records of the transaction that do not persistently include timestamp information, and decrement the reference count data of the transaction when a record of the transaction persistently includes timestamp information.

In accordance with yet another aspect of the disclosed subject matter, the volatile reference count component can maintain with each page in a database cache a reference count for each transaction, wherein the reference count for each transaction indicates how many records updated by a transaction for each given page, were timestamped during the time that the one or more pages in the database cache were in the database cache since the last flush of the one or more pages to a persistent medium.

In accordance with another aspect of the disclosed subject matter, the volatile reference count component can decrement the reference count for each transaction when a record of the transaction is stored in a page in a main memory database cache, wherein the record of the transaction was timestamped during a time the page was in the main memory database cache, and wherein the volatile reference count component received acknowledgement that the page was written to a disk. Further, the reference count component can subtract the reference count for each transaction associated with the page in the main memory database cache from the reference count data maintained in the volatile timestamp table.

In accordance with yet another aspect of the disclosed subject matter, the volatile reference count component can remove an entry from the volatile timestamp table when a reference count associated with the entry becomes zero and the transaction associated with the entry has not had a record of the transaction written to the persistent timestamp table. In accordance with one aspect of the disclosed subject matter, the checkpoint component can map an identification of the transaction to a timestamp of the transaction and its reference count in an entry of the persistent timestamp table. In accordance with another aspect of the disclosed subject matter, the checkpoint component can include a batch component that updates the persistent timestamp table as needed during every checkpoint cycle.

In accordance with one aspect of the disclosed subject matter, the batch component can update the persistent timestamp table by at least one of (1) adding a persistent timestamp table entry associated with a transaction, the transaction associated with at least one record that does not persistently contain timestamp information when a new redo scan start point associated with a current checkpoint cycle will result in the commit record of the transaction being truncated from the recovery log; (2) removing a persistent timestamp table entry associated with a transaction, wherein all records of the transaction persistently contain timestamp information and a record for the transaction has been previously written to the persistent timestamp table; or (3) removing a volatile timestamp table entry associated with a transaction when all records of the transaction persistently contain timestamp information and there is no record for the transaction in the persistent timestamp table.

In accordance with yet another aspect of the disclosed subject matter, the volatile reference count component can store an active portion of the persistent timestamp table in the volatile timestamp table, wherein the volatile reference count component can map an identification of the transaction to a timestamp of the transaction in the active portion of the persistent timestamp table stored in the volatile timestamp table. In accordance with one aspect of the disclosed subject matter, the volatile reference count component can maintain page reference count data of a transaction associated with a page in a main memory database cache. That is, on a given page, the records of each transaction on the page that have been timestamped since the page was last written are counted, and these counts for the transactions are kept in association with the page.

The page in main memory database cache can include one or more records of the transaction that have not been timestamped. Further, the volatile reference count component can increment the page reference count data of the transaction for each of the one or more records of the transaction that have been timestamped since the page was last flushed to disk. In addition, when the page is written to disk, all records of committed transactions that have not yet been timestamped can be timestamped immediately prior to the write, updating the transaction reference counts associated with the page. When the page write has completed (and acknowledged by the disk subsystem), the transaction reference counts for the written page can be subtracted from the reference counts maintained by the reference count component in the volatile timestamp table for each transaction.

When a page is read into main memory from disk, the reference count component can read the current untimestamped records of the page, and when a record's transaction has committed, it can timestamp the record. Thus, timestamping of records of transactions is resumed when a page is read into main memory database cache. In this way, timestamping that was previously incomplete can be completed.

The following description and the annexed drawings set forth in detail certain illustrative aspects of the disclosed subject matter. These aspects are indicative, however, of but a few of the various ways in which the principles of the innovation may be employed. The disclosed subject matter is intended to include all such aspects and their equivalents. Other advantages and distinctive features of the disclosed subject matter will become apparent from the following detailed description of the innovation when considered in conjunction with the drawings.

BRIEF DESCRIPTION OF THE DRAWINGS

Non-limiting and non-exhaustive embodiments of the invention are described with reference to the following figures, wherein like reference numerals refer to like parts throughout the various views unless otherwise specified.

DETAILED DESCRIPTION

Embodiments of systems and methods that facilitate more efficient timestamping in a lazy timestamping transaction environment are described herein. In the following description, numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrase "in one embodiment" or "in an embodiment" in various places throughout this specification are not necessarily all referring to the same embodiment. Furthermore, the particular features, structures, or characteristics may be combined in any suitable manner in one or more embodiments.

The subject invention provides systems and methods that facilitate more efficient timestamping in a lazy timestamping transaction-time database environment. Embodiments of the invention include techniques for decreasing overhead consumed during short transactions by writing the transaction ID timestamp mapping into the transaction's commit record instead of updating a persistent timestamp table. Further, the set of transactions whose entries have not yet been recorded in the transaction ID timestamp table can be written to the transaction ID timestamp table as a batch during a checkpointing process.

In addition, embodiments of the invention include techniques for reducing costs associated with maintaining a persistent timestamp table by limiting postings to the persistent timestamp table for only those transactions whose timestamping is not complete at the time of a checkpoint, such that the checkpoint activity would truncate their commit records from the recovery log. Further, embodiments of the invention include techniques for efficiently guaranteeing that the reference counts of remaining records needing timestamping, used to determine when transaction timestamping is complete, are updated as soon as the page upon which the timestamped records reside has been written to persistent storage.

Figure 1:
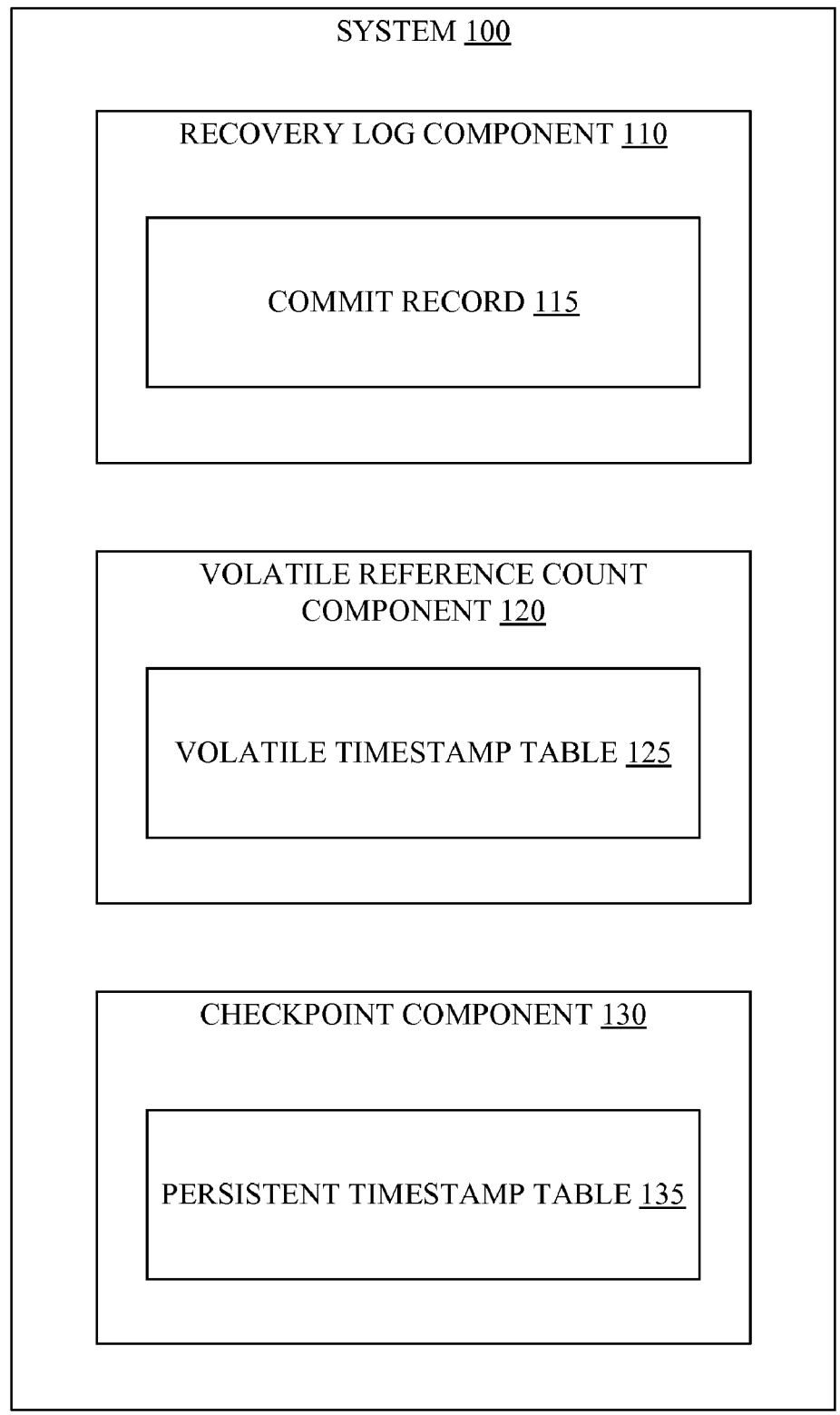
FIG. 1 is a demonstrative system that facilitates more efficient timestamping in a lazy timestamping transaction environment, in accordance with an embodiment of the invention.

FIG. 1 is a demonstrative system that facilitates more efficient timestamping in a lazy timestamping transaction environment, in accordance with an embodiment of the invention. System 100 and the systems and processes explained below may constitute machine-executable instructions embodied within a machine (e.g., computer) readable medium, which when executed by a machine will cause the machine to perform the operations described. Additionally, the systems and processes may be embodied within hardware, such as an application specific integrated circuit (ASIC) or the like. The order in which some or all of the process blocks appear in each process should not be deemed limiting. Rather, it should be understood by a person of ordinary skill in the art having the benefit of the instant disclosure that some of the process blocks may be executed in a variety of orders not illustrated.

System 100 illustrated by FIG. 1 can include a recovery log component 110 that can store timestamp information of a transaction in a commit record 115 of the transaction. In one embodiment of the invention, recovery log component 110 can store the mapping of a transaction's ID to a timestamp of the transaction and reference count data of the transaction in commit record 115 of the transaction. Compared to current lazy timestamping technology, embodiments of the subject invention reduce costs associated with maintaining a persistent timestamp table by storing timestamp information in a transaction's commit record 115—updating the transaction's commit record 115 with timestamp information has a negligible impact on the performance of the writing of the transaction's commit record 115.

Further, system 100 can include a volatile reference count component 120 that can update reference count data of the transaction in a volatile timestamp table 125 to reflect a number of records of the transaction that do not persistently include timestamp information. In one embodiment, volatile reference count component 120 can store the reference count data of the transaction with the transaction's ID and the timestamp of the transaction in volatile timestamp table 125. In another embodiment, volatile reference count component 120 can increment the reference count data of the transaction to reflect a number of updated records of the transaction, before a persistent timestamp has been assigned for the updated records. In addition, volatile reference count component 120 can decrement the reference count data of the transaction when a record of the transaction persistently includes timestamp information.

Moreover, system 100 can include a checkpoint component 130 that can update timestamp information of the transaction in a persistent timestamp table 135, which ensures that transaction ID timestamp mapping information persists for transactions whose timestamp information does not yet persist in all records of the transaction before commit record 115 of the transaction is deleted. This assures that the transaction ID timestamp mapping can be recovered should the database system crash. Database checkpointing is a method of shortening the time required to recover from a system failure. A checkpoint involves writing cached disk pages that have been updated back to their locations in stable storage (e.g., disk), or perhaps simply noting that they have already been so written. This removes the necessity of having to re-execute the updates that have been logged for these pages. A checkpoint action changes the redo recovery scan start point. This start point is indicated by a log sequence number (LSN), which is essentially a log address of the first log record that should be checked to see if redo is needed. Applying this technique carefully permits recovery to only need to read updates that have been logged at a later point, i.e., a point denoted by a larger LSN.

Figure 2:
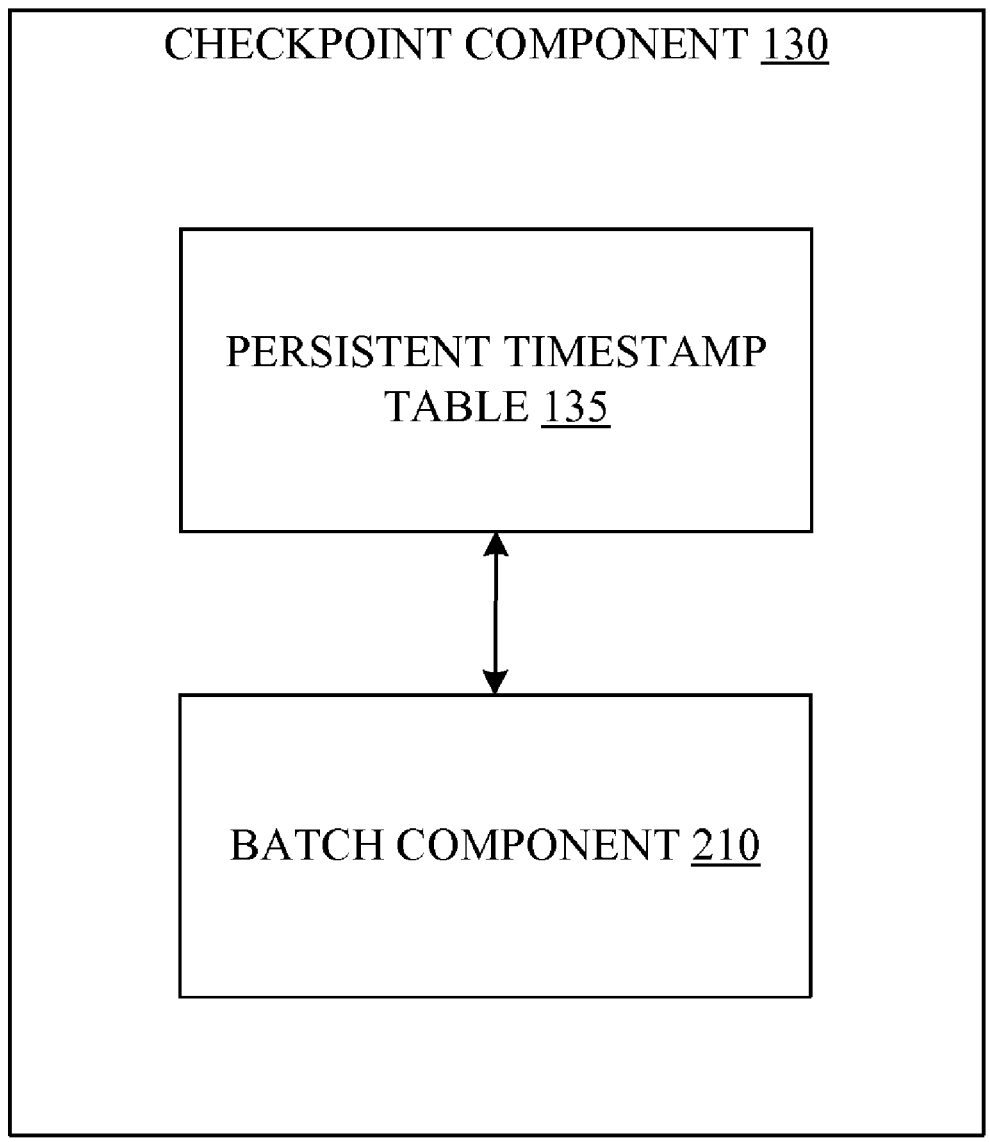
FIG. 2 illustrates a checkpoint component of a system that facilitates more efficient timestamping in a lazy timestamping transaction environment, in accordance with an embodiment of the invention.

FIG. 2 illustrates a checkpoint component 130 of a system 200 that facilitates more efficient timestamping in a lazy timestamping transaction environment, in accordance with an embodiment of the invention. Checkpoint component 130 can store a mapping of the transaction's ID to a timestamp of the transaction and reference count data of the transaction in persistent timestamp table 135. In one embodiment, checkpoint component 130 can include a batch component 210 that updates persistent timestamp table 135 during every checkpoint cycle. In another embodiment, batch component 210 can update persistent timestamp table 135 by adding a persistent timestamp table entry associated with a transaction that has a record that does not persistently contain timestamp information. Further, batch component 210 can remove a persistent timestamp table entry associated with a transaction when all records of the transaction persistently include timestamp information. In yet another embodiment, batch component 210 can update persistent timestamp table 135 before a checkpoint redo scan point is advanced.

Unlike current lazy timestamping technology, in which an entry is inserted into a persistent timestamp table during each transaction, embodiments of the subject invention decrease overhead consumed during update transactions by updating persistent timestamp table 135 as a batch during the checkpointing process. Moreover, updating a persistent timestamp table 135 as a batch during the checkpointing process reduces costs associated with maintaining persistent timestamp table 135. Cost can be further reduced by reducing the number of entries that need to be inserted into persistent timestamp table 135—persistent timestamp table 135 entries are added only when needed over an extended time, i.e., the period of time is sufficiently long that the checkpoint process will truncate the commit record of the transaction by its advance of the redo scan start point.

Figure 3:
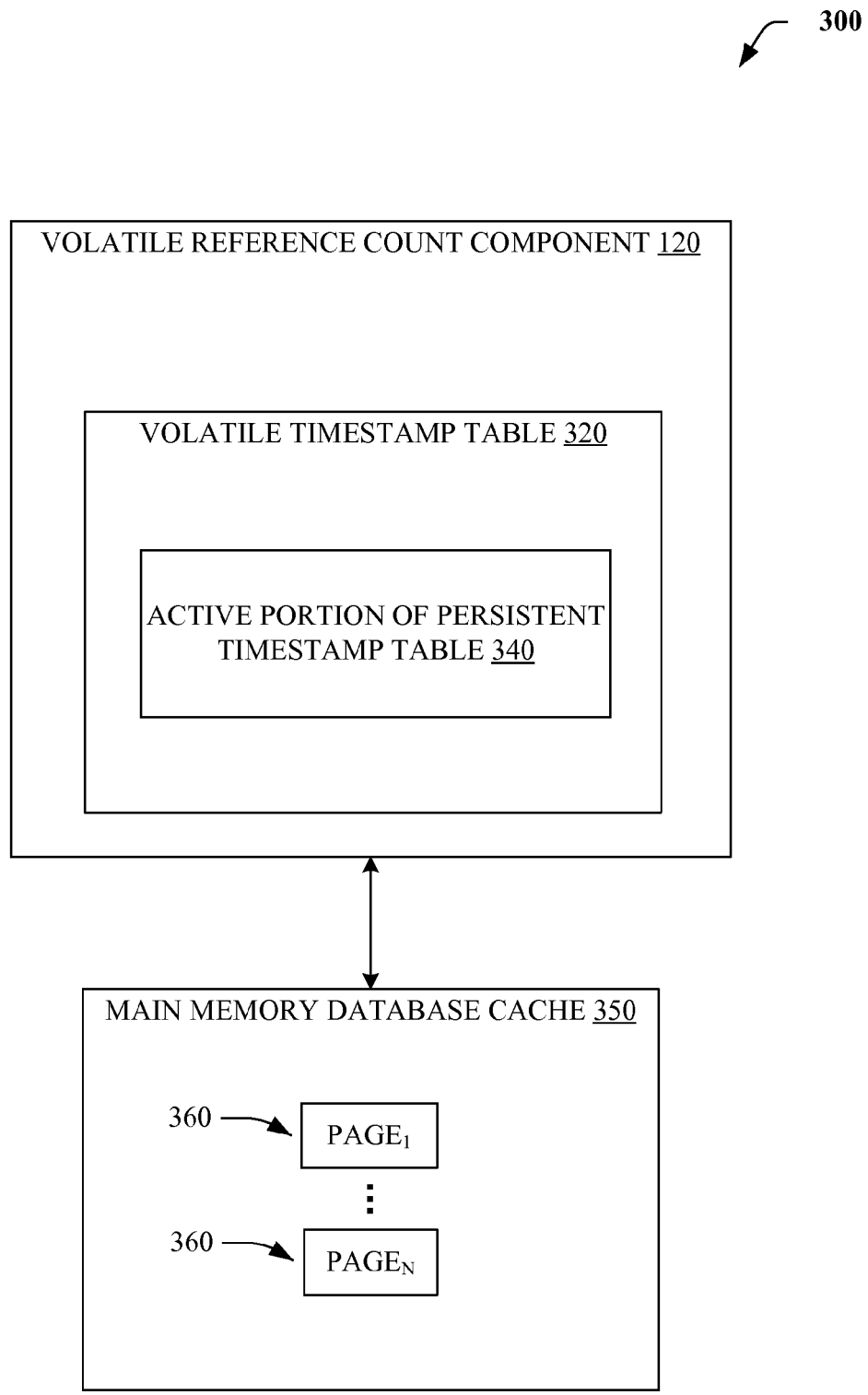
FIG. 3 illustrates a volatile reference count component of a system that facilitates more efficient timestamping in a lazy timestamping transaction environment, in accordance with an embodiment of the invention.

FIG. 3 illustrates a volatile reference count component 120 of a system 300 that facilitates more efficient and timely maintenance of reference counts in a lazy timestamping transaction environment, in accordance with an embodiment of the invention. Volatile reference count component 120 can store an active portion of persistent timestamp table 135 in volatile timestamp table 320 (at 340). In one embodiment, volatile reference count component 120 can store the mapping of a transaction's ID to the timestamp of the transaction in volatile timestamp table 320 at 340. In this way, volatile timestamp table 320 can also serve as a cache for entries of persistent timestamp table 135 that are expected to be used in the near future, improving the efficiency of the timestamping process.

In another embodiment, volatile reference count component 120 can maintain page reference count data for transactions that have records being timestamped in a page 360 in a main memory database cache 350—page 360 in main memory database cache 350 includes one or more records of a transaction that have not yet been persistently timestamped. Further, volatile reference count component 120 can increment page reference count data of the transaction for each of the one or more records of the transaction that are timestamped.

In yet another embodiment, volatile reference count component 120 can decrement reference count data of a transaction when records of the transaction are stored in a page 360 in main memory database cache 350, the record was timestamped during a time the page 360 was in main memory database cache 350, and volatile reference count component 120 received acknowledgement that the page 360 was written to disk. Thus, by learning that all records of a transaction have been stored persistently as early as possible, reference count data of the transaction can be updated as early as possible—removing the need for batch component 210 to add entries to persistent timestamp table 135 during the next checkpoint cycle when all records of the transaction have been persistently timestamped, perhaps as part of the current checkpoint cycle.

Figure 4:
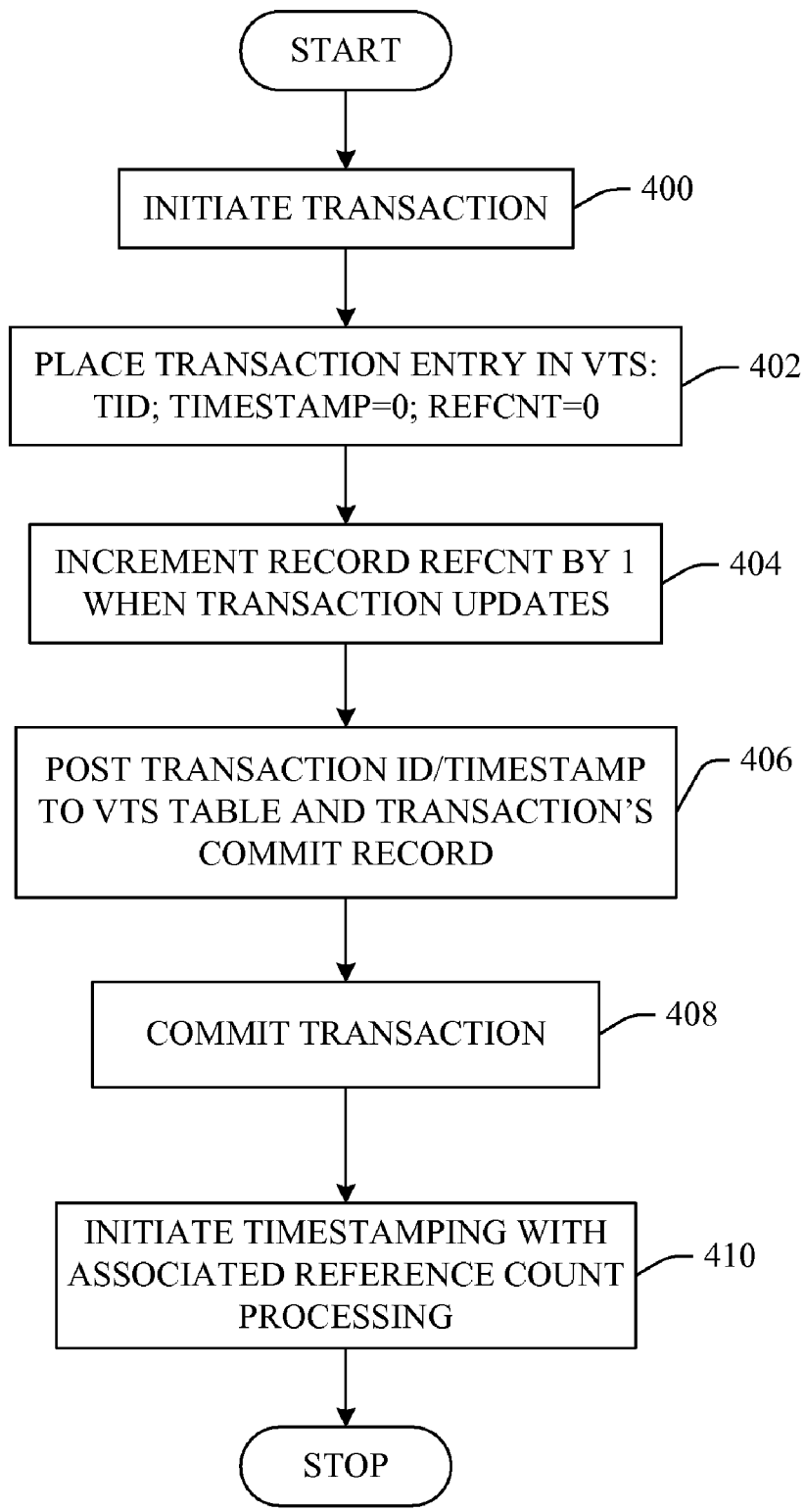
FIG. 4 illustrates a methodology of volatile reference count processing, in accordance with an embodiment of the invention.

FIG. 4 illustrates a methodology of volatile reference count processing, in accordance with an embodiment of the invention. While, for purposes of simplicity of explanation, the one or more methodologies shown herein, e.g., in the form of a flow chart, are shown and described as a series of acts, it is to be understood and appreciated that the subject invention is not limited by the order of acts, as some acts may, in accordance with the invention, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the invention.

When a transaction begins at 400, an entry for the transaction is placed in the volatile timestamp (VTS) table at 402. This entry includes a transaction ID for the transaction (denoted TID), a null value (zero) for timestamp (TIMESTAMP=0), and a zero value for reference count (REFCNT=0), since the timestamp for the transaction is not yet known, and updating is yet to be done and no timestamp activity is needed. The VTS table is a hash table that facilitates the accessing of chains of entries that share the same hashed transaction ID. The cost of accessing the VTS table can be made close to a single access (chain length of one) with a sufficiently large (sparse) hash table.

At 404, whenever a transaction updates a record of the transaction, the transaction's reference count data is incremented by one in the transaction's associated VTS table entry. Entries for aborted transactions are simply removed as part of the abort process. Partial rollbacks decrement the reference count for each undone update. At 406, the timestamp for the transaction is posted to the VTS table entry for the transaction and the mapping of transaction ID to transaction timestamp is also posted in the transaction's commit record. The reference count may also usefully be included in the commit record. At 408, the transaction is committed. At 410, timestamping is initiated with the associated reference count processing.

Figure 5A:
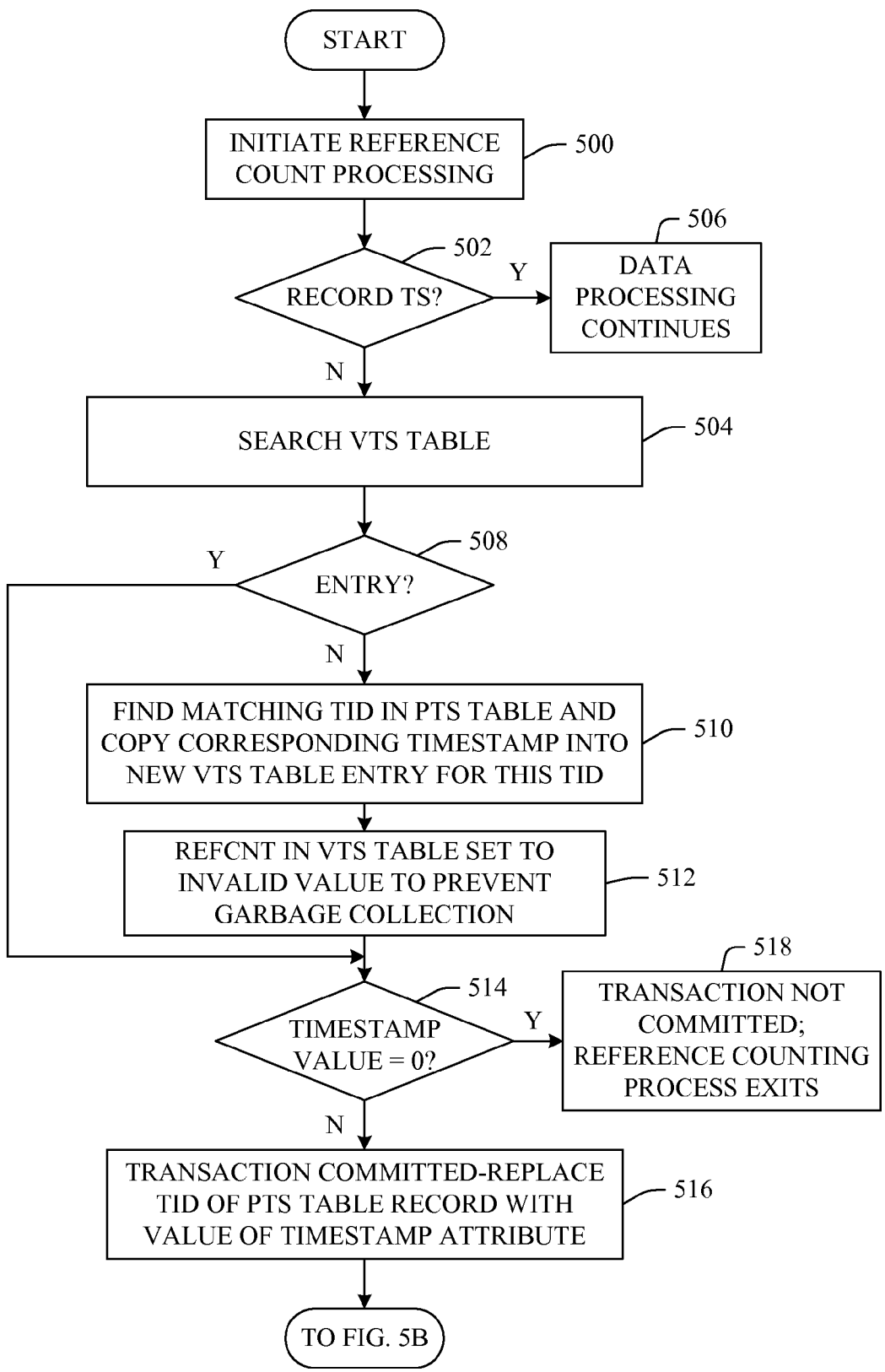
FIGS. 5A and 5B illustrate a more detailed methodology of reference count management, in accordance with an embodiment of the invention.
Figure 5B:
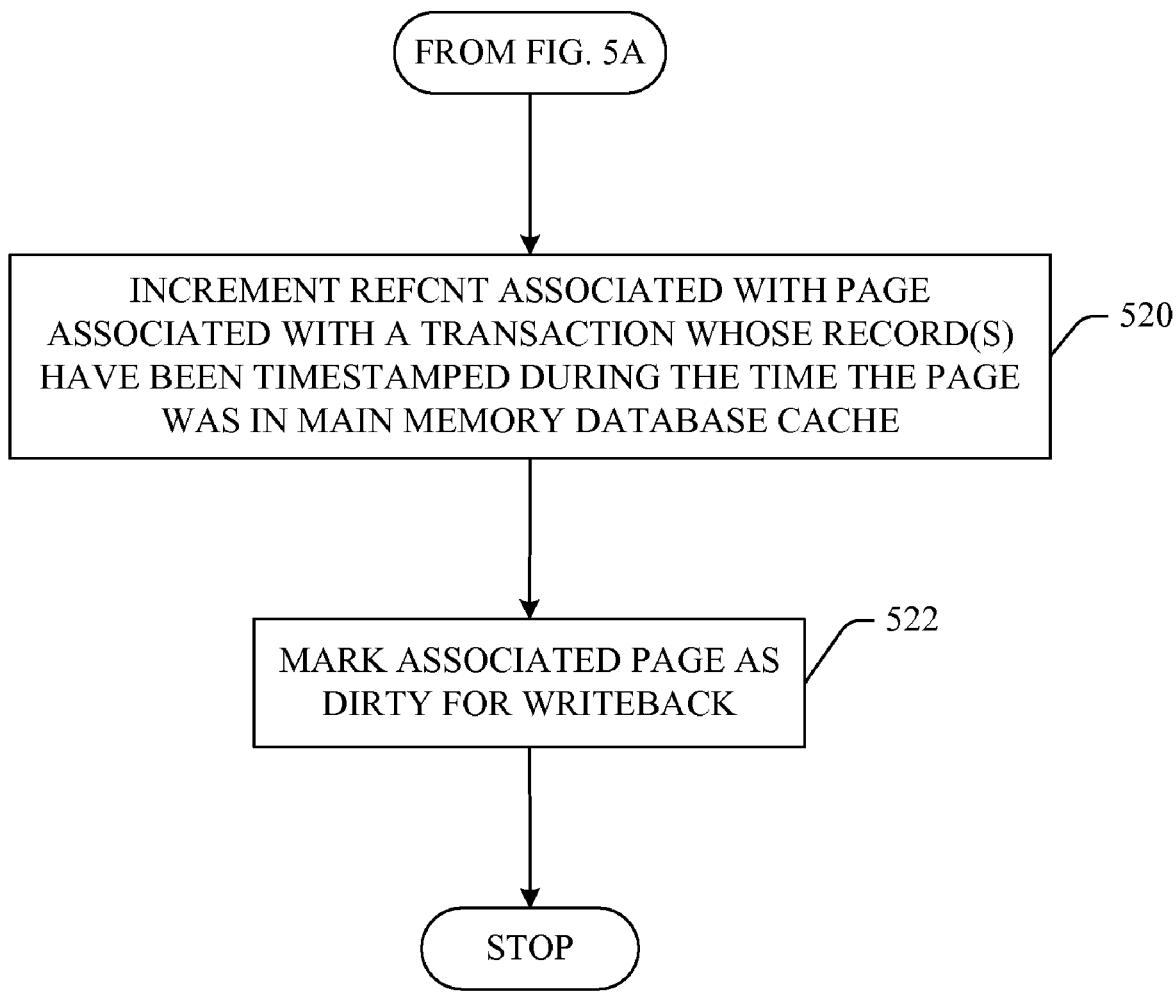

FIGS. 5A and 5B illustrate a more detailed methodology of reference count management, in accordance with an embodiment of the invention. Referring now to FIG. 5A, timestamping and reference count processing are initiated at 500. At 502, when a record version without a timestamp is encountered in the transaction time database, flow progresses to 504, at which a check is made of the corresponding VTS table entry using the transaction ID of the transaction time database record version. If the record version is already timestamped, proceed to 506 where database processing continues. At 508, if there is no entry for the transaction ID in the VTS table, progress is to 510, at which a persistent timestamp (PTS) table entry for the transaction ID is read, and the timestamp copied from its corresponding PTS table entry into a new VTS table entry for this transaction ID, along with the reference count if that is also present.

At 512, the reference count (REFCNT) field in the VTS table is set to an invalid value (e.g., a negative number), should the reference count not have been included in the PTS table entry, to prevent the corresponding entry in the PTS table from being garbage collected. If the reference count was present in the PTS, then the VTS reference count (REFCNT) field will be set to the PTS reference count. On the other hand, if there is an entry in the VTS detected at 508, proceed to 514 to check the timestamp value. At 514, the system performs a check to determine if the timestamp attribute is equal to zero. If there is a non-zero value in the timestamp attribute, the transaction has been committed, and flow progresses to 516, at which the transaction ID in the transaction time table record is replaced with the value of the timestamp attribute in the VTS.

If the timestamp in the VTS entry is zero, the transaction has not committed, and the reference counting process exits at 518. Continuing with FIG. 5B, the fact that the record for the transaction has been timestamped is recorded in a reference count for the transaction that is associated with the page. The reference count for the transaction that is associated with the page is incremented to reflect that one additional record on the page for the transaction has been timestamped. Every time a record on a given page for this transaction is timestamped, this reference count is incremented as indicated at 520. At 522, the page containing the newly timestamped record is marked as "dirty" so that the cache manager will write it back when the page leaves the database cache.

Figure 6:
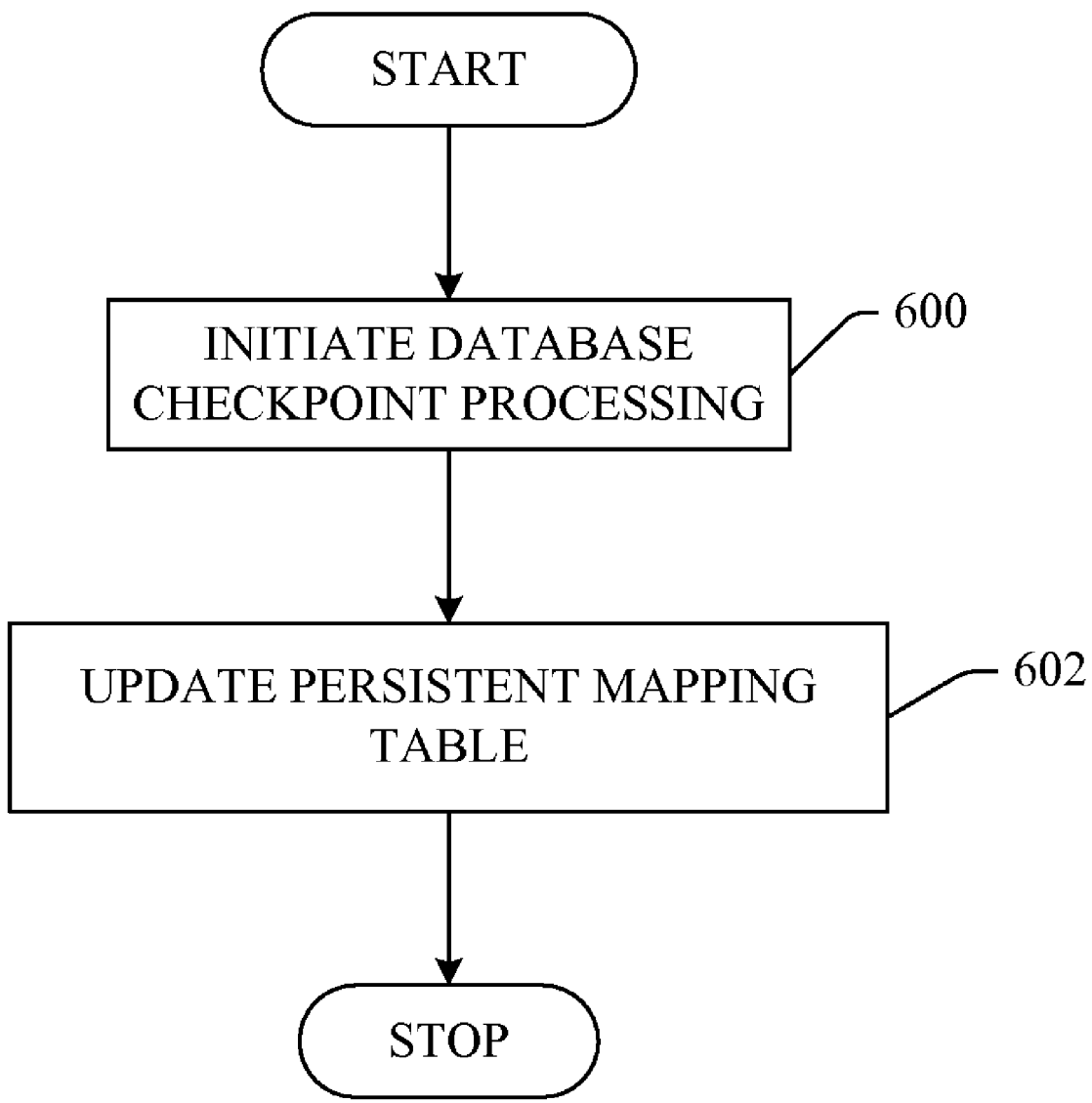
FIG. 6 illustrates a methodology of checkpoint processing, in accordance with an embodiment of the invention.

FIG. 6 illustrates a methodology of checkpoint processing, in accordance with an embodiment of the invention. At 600, a database checkpoint is performed. At 602, whenever a system checkpoint is performed, checkpoint component, in a batch process, can add a persistent timestamp table entry for each transaction whose timestamping is not complete, as indicated by its presence in the VTS with a non-zero reference count, and for which its commit record will be truncated by the checkpoint process. Alternatively, if a record for the transaction exists in the VTS with a zero reference count, its entry is removed (deleted) from the persistent transaction ID timestamp table. In one embodiment, the inserts and deletes described here can be done as part of a batch process that can be performed before a checkpoint redo scan point is advanced, i.e., before the checkpoint is complete.

During normal transactions, locking prevents accessing uncommitted record versions. In this case, if a record can be accessed during such a transaction, it is known to be committed, regardless of whether it is timestamped. If not timestamped, the VTS table is consulted and the appropriate timestamping performed. During snapshot transactions, queries execute without locking, and it is not known whether a record version without a timestamp is committed. In this case, the VTS table is consulted to determine commit status. Timestamping is also performed, as described above.

Figure 7:
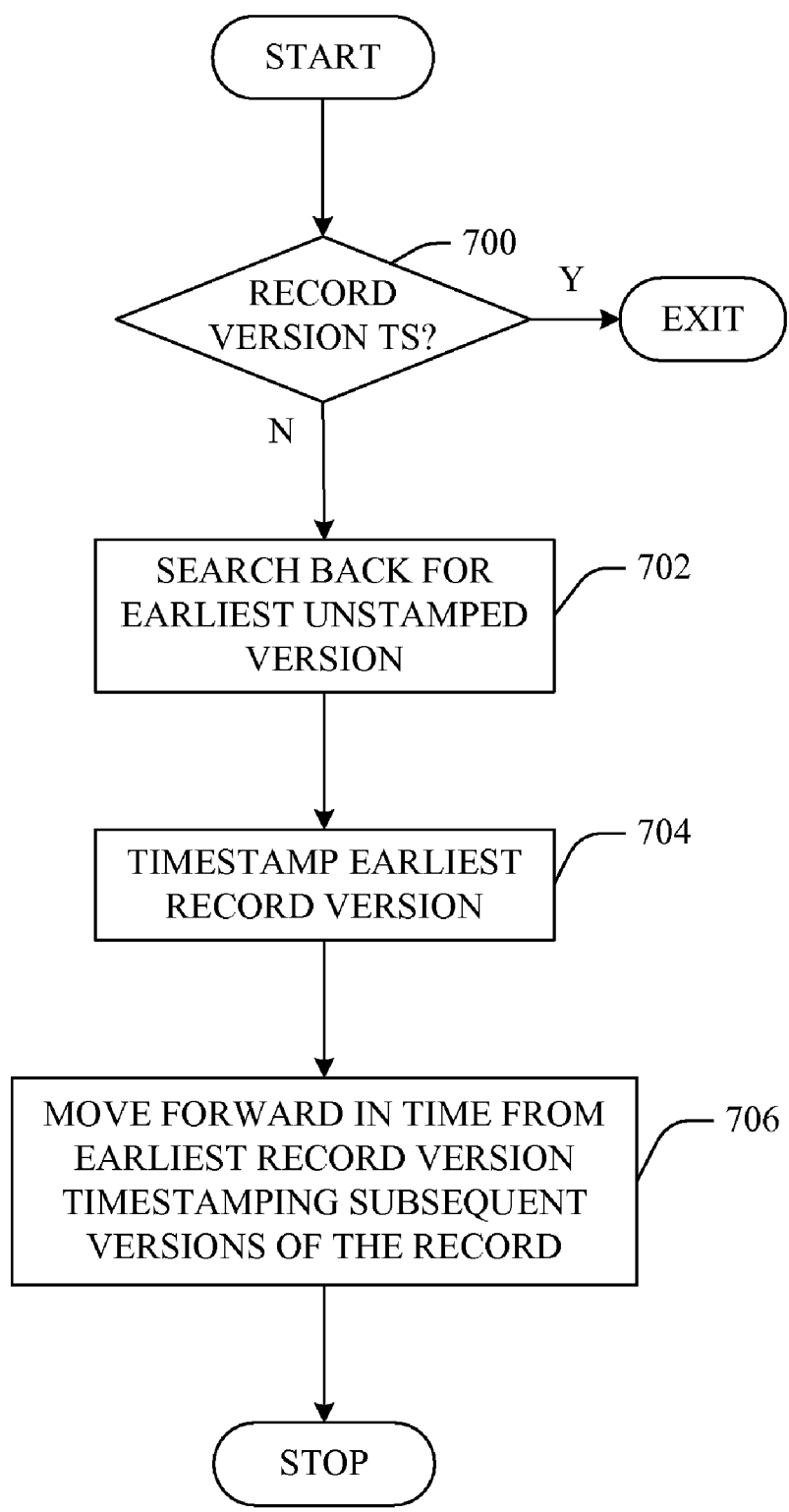
FIG. 7 illustrates a methodology of timestamping earlier record versions based on a timestamped record version, in accordance with an embodiment of the invention.

Finally, it is useful to enforce an invariant that once a record version is timestamped, all other earlier versions of the record also are timestamped. FIG. 7 illustrates a methodology of timestamping earlier record versions based on a timestamped record version in accordance with an embodiment of the invention. This shortens any search for versions needing timestamping. Hence, at 700, the system checks if a record version is timestamped. If not, progress is to 702, at which, when accessing record, a search back for the earliest unstamped version is performed. At 704, the earliest version is timestamped. At 706, moving forward in time from the earliest version, subsequent versions of the record are timestamped. At 700, if the record version is timestamped, the process exits.

Figure 8:
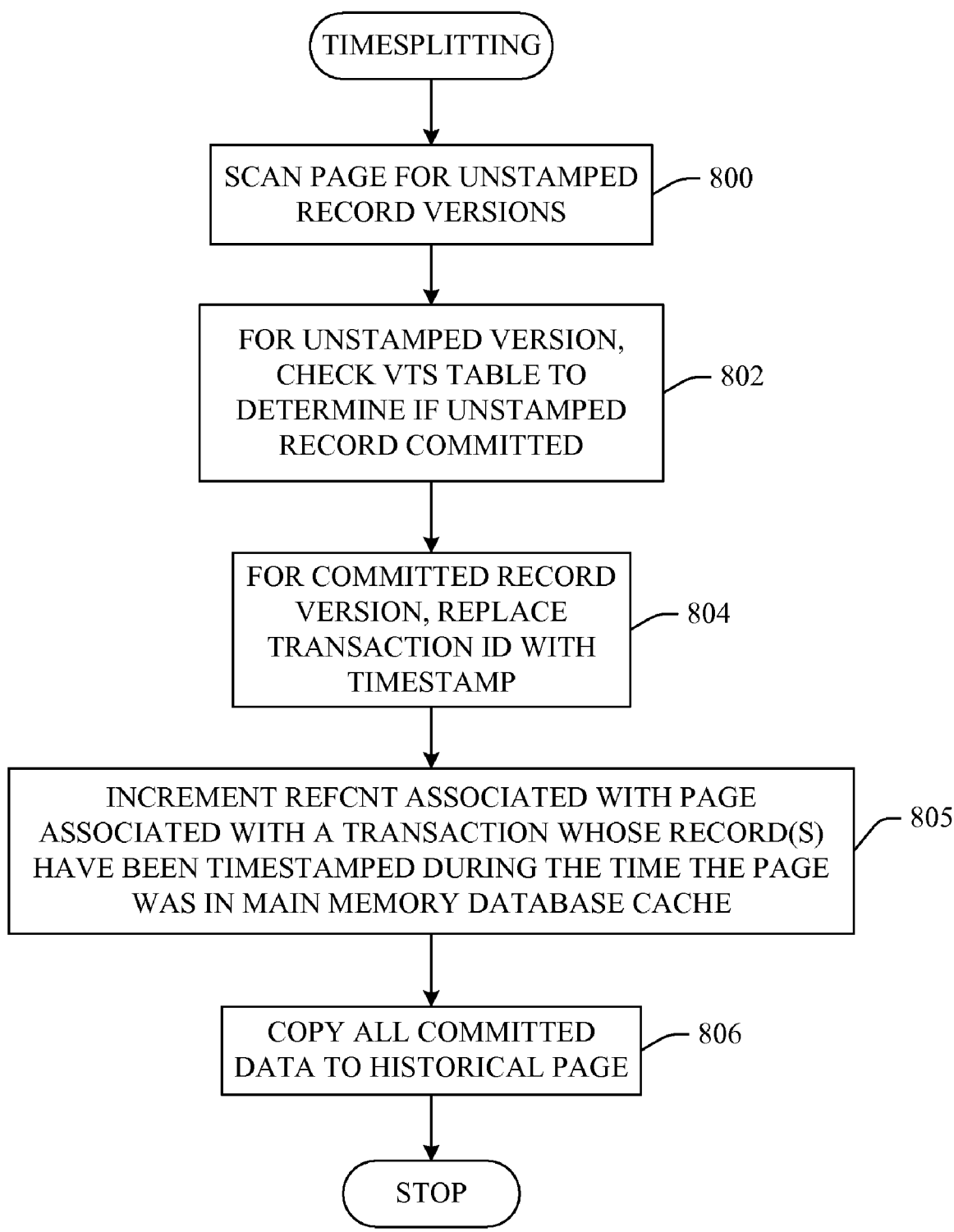
FIG. 8 illustrates a methodology for bulk page processing that utilizes page timesplitting, in accordance with an embodiment of the invention.

FIG. 8 illustrates a methodology of bulk page processing that utilizes page timesplitting, in accordance with an embodiment of the invention. In a first operation, timesplitting a page is usually performed using a split time that is the current time. At 800, the page is scanned to determine which record versions are unstamped. All timestamped versions are immediately seen to be committed. For each unstamped record version, the VTS table is checked to see whether the transaction ID in the record version is for a committed transaction, as indicated at 802.

At 804, if the transaction is committed (the VTS table entry for the transaction ID has a non-zero timestamp), then the transaction ID is replaced by the timestamp. At 805, a reference count associated with each page in a main memory database cache is incremented, the reference count associated with a transaction whose record(s) on a page in main memory database cache have been timestamped during the time the page was in the main memory database cache. Next, timesplitting activity copies all committed data to the historical page, as indicated at 806. Thus, the incremental cost of timestamping record versions during this activity is small, since it is desired to know whether record versions are committed or not in any event. Further, it is very useful to have all committed versions on "historical" pages timestamped because these pages can be read-only, and never need locking in order to do the timestamping later.

Figure 9:
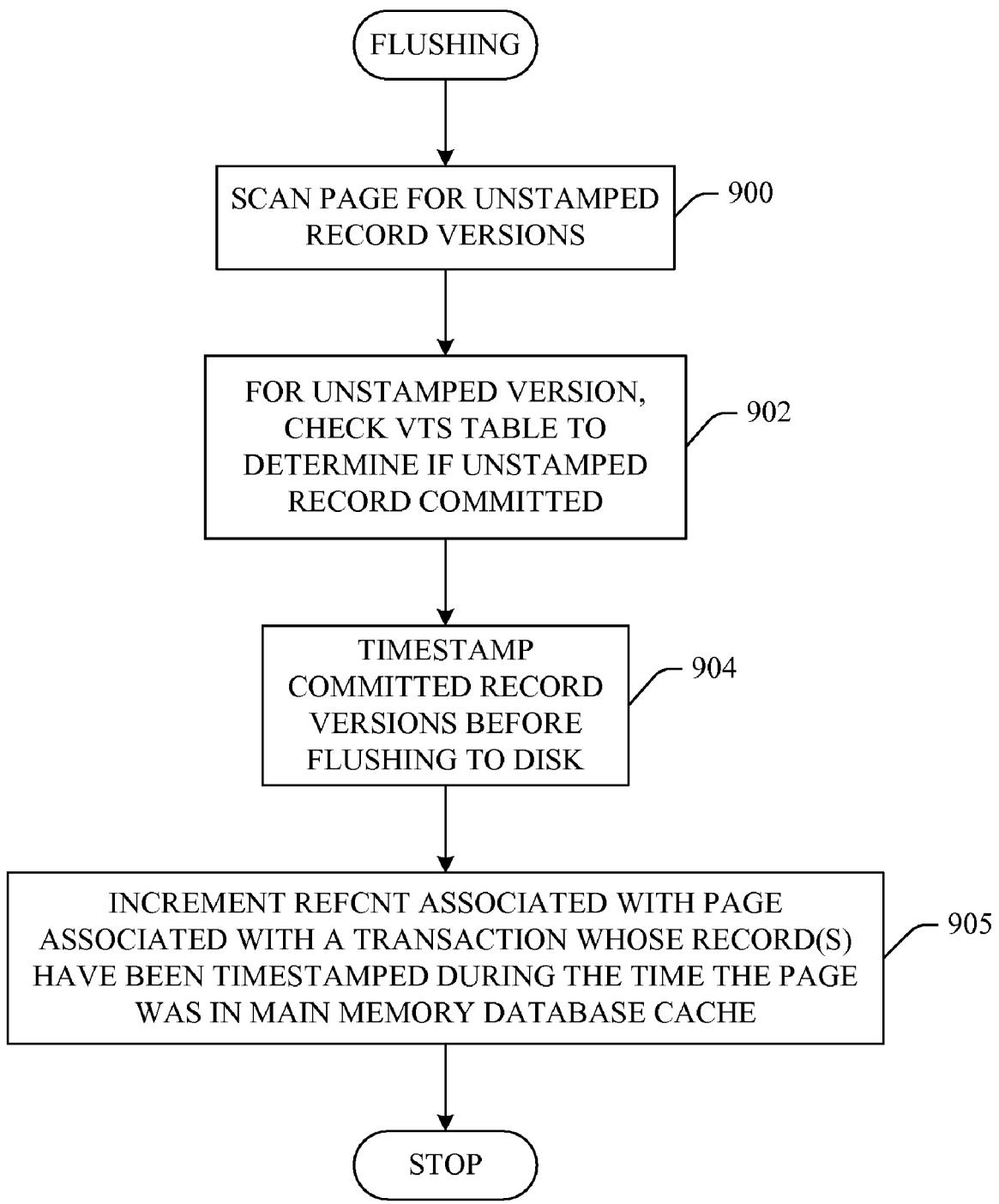
FIG. 9 illustrates a methodology of bulk page processing that flushes a page to disk, in accordance with an embodiment of the invention.

FIG. 9 illustrates a second methodology of bulk page processing that flushes a page to disk, in accordance with an embodiment of the invention. As performed in the timesplitting operation, the page is scanned for untimestamped record versions, as indicated at 900. When an unstamped record version is found, the VTS is checked to determine whether the unstamped record version is committed, as indicated at 902. If an unstamped version is committed, it is timestamped before flushing the page to disk, as indicated at 904. Record versions of uncommitted transactions will be timestamped eventually at a later time. This approach has the benefit of having the timestamping become immediately stable. This timestamping is reflected in the VTS table's reference count for transactions whose records are timestamped at this time once the page has been written to disk, as the records are now stably timestamped.

Pages that are flushed as part of the checkpointing activity hence have their timestamping activity reflected in the VTS table prior to the moving of the redo scan start point. This greatly increases the number of transactions whose timestamping is seen as having been completed. At 905, a reference count associated with each page in a main memory cache associated with a transaction whose record(s) on each page have been timestamped during the time each page was in the main memory database cache is incremented. It is these counts that are subtracted from the VTS REFCNT entry for transactions with records on the page that have been timestamped since the page was last flushed to disk.

Figure 10:
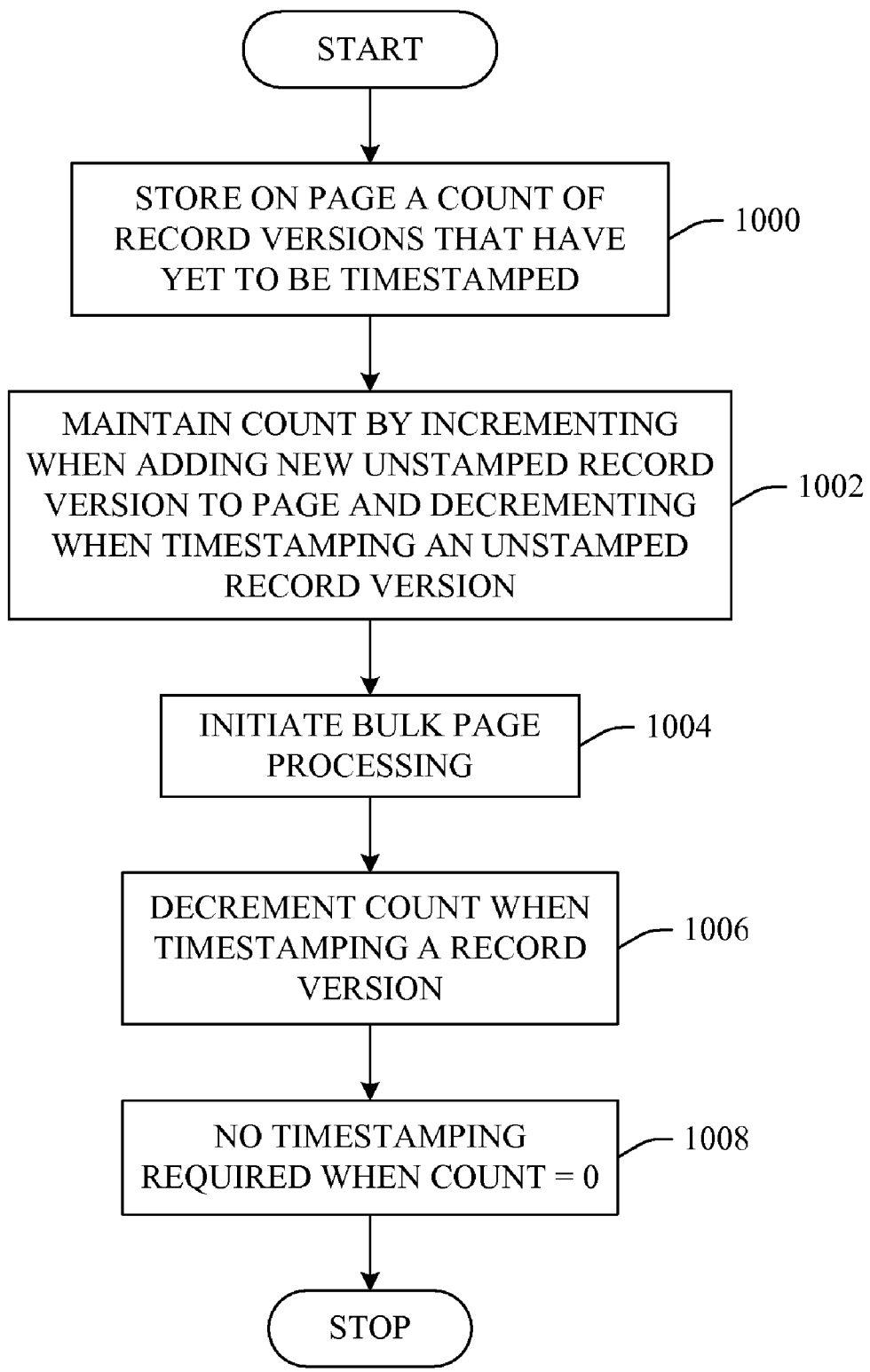
FIG. 10 illustrates a methodology for avoiding unnecessary checking of record versions, in accordance with an embodiment of the invention.

FIG. 10 illustrates a methodology for avoiding unnecessary checking of record versions, in accordance with an embodiment of the invention. Even for the bulk page operations, it is desired to avoid checking for versions to timestamp. Prior to performing bulk page processing, a count of the record versions that have yet to be timestamped is stored on the page, as indicated at 1000. This count is maintained by incrementing the count whenever adding a new unstamped record version to the page and by decrementing the count whenever timestamping an as yet untimestamped record version, as indicated at 1002. At 1004, bulk page operations are initiated. At 1006, the count is decremented whenever timestamping a record version. At 1008, if the count is zero, there is no timestamping needed on the page. This can be exploited whenever the count goes to zero during bulk page processing.

What has been described above includes examples of the subject innovation. It is, of course, not possible to describe every conceivable combination of components or methodologies for purposes of describing the subject innovation, but one of ordinary skill in the art can recognize that many further combinations and permutations of the subject innovation are possible. Accordingly, the disclosed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

As utilized herein, terms "component," "system," "interface," and the like are intended to refer to a computer-related entity, hardware, software (e.g., in execution), and/or firmware. For example, a component can be a process running on a processor, a processor, an object, an executable, a program, and/or a computer. By way of illustration, both an application running on a server and the server can be a component. One or more components can reside within a process and a component can be localized on one computer and/or distributed between two or more computers.

Artificial intelligence based systems (e.g., explicitly and/or implicitly trained classifiers) can be employed in connection with performing inference and/or probabilistic determinations and/or statistical-based determinations as in accordance with one or more aspects of the disclosed subject matter as described herein. As used herein, the term "inference," "infer," or variations in form thereof refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events.

Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources. Various classification schemes and/or systems (e.g., support vector machines, neural networks, expert systems, Bayesian belief networks, fuzzy logic, data fusion engines) can be employed in connection with performing automatic and/or inferred action in connection with the disclosed subject matter.

Furthermore, the disclosed subject matter may be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, carrier, or media. For example, computer readable media can include, but are not limited to, magnetic storage devices (e.g., hard disk, floppy disk, magnetic strips), optical disks (e.g., CD, DVD), smart cards, and flash memory devices (e.g., card, stick, key drive).

Further, it should be appreciated that a carrier wave can be employed to carry computer-readable electronic data such as those used in transmitting and receiving electronic mail or in accessing a network such as the Internet or a local area network (LAN). Of course, those skilled in the art will recognize many modifications may be made to this configuration without departing from the scope or spirit of the disclosed subject matter. Moreover, the word "exemplary" is used herein to mean serving as an example, instance, or illustration. Any aspect or design described herein as "exemplary" is not necessarily to be construed as preferred or advantageous over other aspects or designs.

Figure 11:
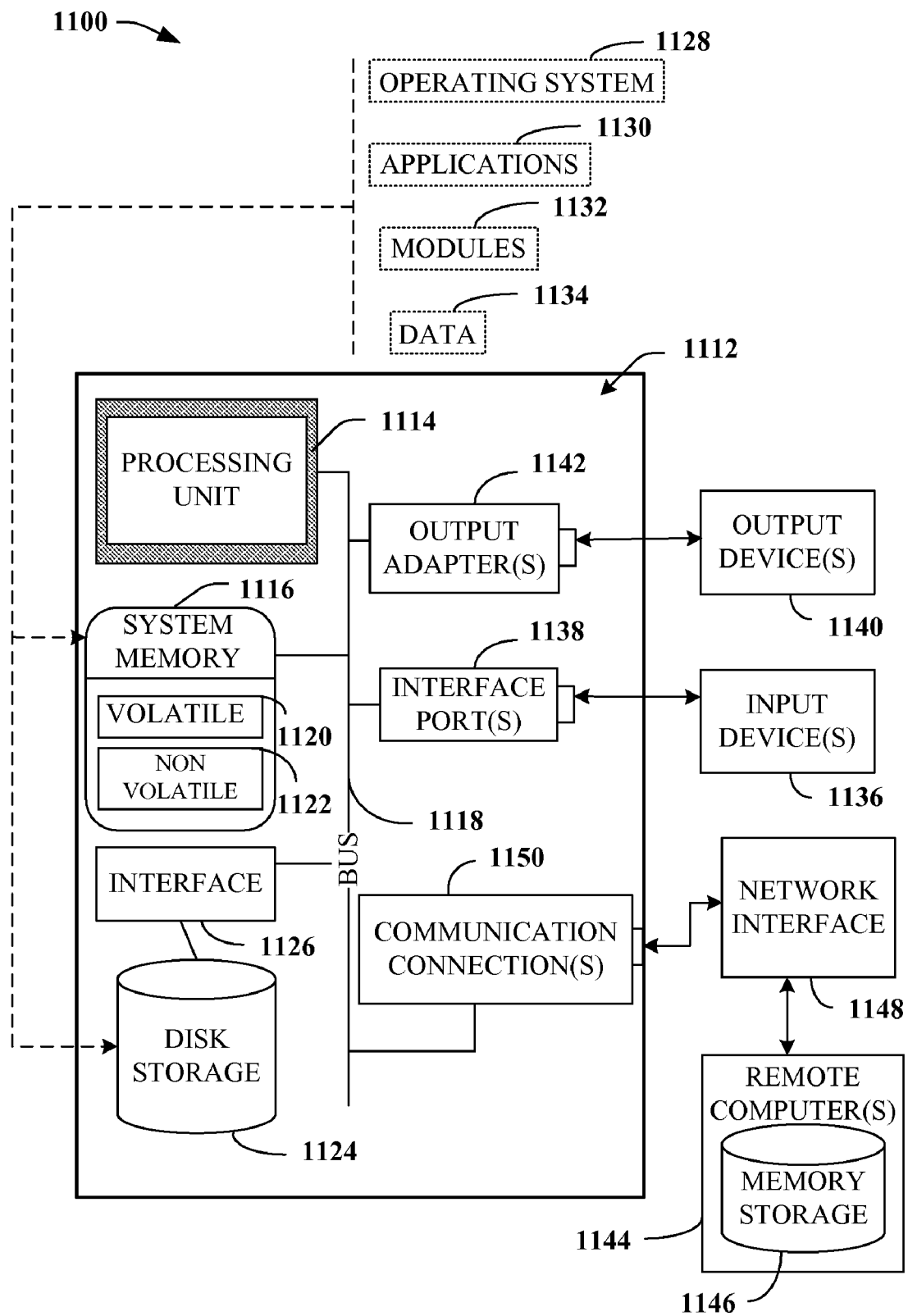
FIG. 11 illustrates a block diagram of a computer operable to execute the disclosed systems and methods, in accordance with an embodiment of the invention.
Figure 12:
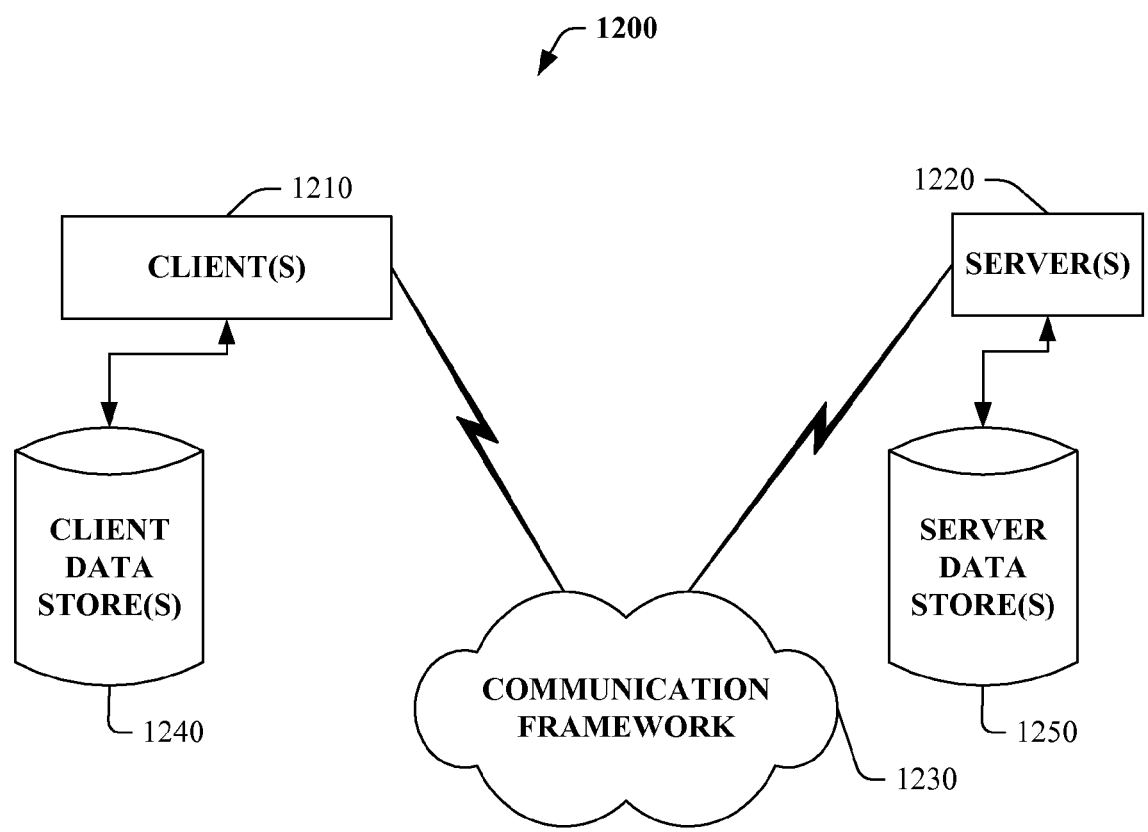
FIG. 12 illustrates a schematic block diagram of an exemplary computing environment, in accordance with an embodiment of the invention.

In order to provide a context for the various aspects of the disclosed subject matter, FIGS. 11 and 12, as well as the following discussion, are intended to provide a brief, general description of a suitable environment in which the various aspects of the disclosed subject matter may be implemented. While the subject matter has been described above in the general context of computer-executable instructions of a computer program that runs on a computer and/or computers, those skilled in the art will recognize that the subject innovation also may be implemented in combination with other program modules. Generally, program modules include routines, programs, components, data structures, etc. that perform particular tasks and/or implement particular abstract data types.

Moreover, those skilled in the art will appreciate that the inventive systems may be practiced with other computer system configurations, including single-processor or multiprocessor computer systems, mini-computing devices, mainframe computers, as well as personal computers, hand-held computing devices (e.g., PDA, phone, watch), microprocessor-based or programmable consumer or industrial electronics, and the like. The illustrated aspects may also be practiced in distributed computing environments where tasks are performed by remote processing devices that are linked through a communications network. However, some, if not all aspects of the claimed innovation can be practiced on stand-alone computers. In a distributed computing environment, program modules may be located in both local and remote memory storage devices.

With reference to FIG. 11, a block diagram of a computer 1100 operable to execute the disclosed systems and methods, in accordance with an embodiment of the invention, includes a computer 1112. The computer 1112 includes a processing unit 1114, a system memory 1116, and a system bus 1118. The system bus 1118 couples system components including, but not limited to, the system memory 1116 to the processing unit 1114. The processing unit 1114 can be any of various available processors. Dual microprocessors and other multiprocessor architectures also can be employed as the processing unit 1114.

The system bus 1118 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Personal Computer Memory Card International Association bus (PCMCIA), Firewire (IEEE 1194), and Small Computer Systems Interface (SCSI).

The system memory 1116 includes volatile memory 1120 and nonvolatile memory 1122. The basic input/output system (BIOS), containing the basic routines to transfer information between elements within the computer 1112, such as during start-up, is stored in nonvolatile memory 1122. By way of illustration, and not limitation, nonvolatile memory 1122 can include ROM, PROM, EPROM, EEPROM, or flash memory. Volatile memory 1120 includes RAM, which acts as external cache memory. By way of illustration and not limitation, RAM is available in many forms such as SRAM, dynamic RAM (DRAM), synchronous DRAM (SDRAM), double data rate SDRAM (DDR SDRAM), enhanced SDRAM (ESDRAM), Synchlink DRAM (SLDRAM), Rambus direct RAM (RDRAM), direct Rambus dynamic RAM (DRDRAM), and Rambus dynamic RAM (RDRAM).

Computer 1112 also includes removable/non-removable, volatile/non-volatile computer storage media. FIG. 11 illustrates, for example, a disk storage 1124. Disk storage 1124 includes, but is not limited to, devices like a magnetic disk drive, floppy disk drive, tape drive, Jaz drive, Zip drive, LS-100 drive, flash memory card, or memory stick. In addition, disk storage 1124 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage devices 1124 to the system bus 1118, a removable or non-removable interface is typically used, such as interface 1126.

It is to be appreciated that FIG. 11 describes software that acts as an intermediary between users and the basic computer resources described in the suitable operating environment 1100. Such software includes an operating system 1128. Operating system 1128, which can be stored on disk storage 1124, acts to control and allocate resources of the computer system 1112. System applications 1130 take advantage of the management of resources by operating system 1128 through program modules 1132 and program data 1134 stored either in system memory 1116 or on disk storage 1124. It is to be appreciated that the disclosed subject matter can be implemented with various operating systems or combinations of operating systems.

A user enters commands or information into the computer 1111 through input device(s) 1136. Input devices 1136 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1114 through the system bus 1118 via interface port(s) 1138. Interface port(s) 1138 include, for example, a serial port, a parallel port, a game port, and a universal serial bus (USB). Output device(s) 1140 use some of the same type of ports as input device(s) 1136.

Thus, for example, a USB port may be used to provide input to computer 1112, and to output information from computer 1112 to an output device 1140. Output adapter 1142 is provided to illustrate that there are some output devices 1140 like monitors, speakers, and printers, among other output devices 1140, which require special adapters. The output adapters 1142 include, by way of illustration and not limitation, video and sound cards that provide a means of connection between the output device 1140 and the system bus 1118. It should be noted that other devices and/or systems of devices provide both input and output capabilities such as remote computer(s) 1144.

Computer 1112 can operate in a networked environment using logical connections to one or more remote computers, such as remote computer(s) 1144. The remote computer(s) 1144 can be a personal computer, a server, a router, a network PC, a workstation, a microprocessor based appliance, a peer device or other common network node and the like, and typically includes many or all of the elements described relative to computer 1112.

For purposes of brevity, only a memory storage device 1146 is illustrated with remote computer(s) 1144. Remote computer(s) 1144 is logically connected to computer 1112 through a network interface 1148 and then physically connected via communication connection 1150. Network interface 1148 encompasses wire and/or wireless communication networks such as local-area networks (LAN) and wide-area networks (WAN). LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1150 refer(s) to the hardware/software employed to connect the network interface 1148 to the bus 1118. While communication connection 1150 is shown for illustrative clarity inside computer 1112, it can also be external to computer 1112. The hardware/software necessary for connection to the network interface 1148 includes, for exemplary purposes only, internal and external technologies such as, modems including regular telephone grade modems, cable modems and DSL modems, ISDN adapters, and Ethernet cards.

FIG. 12 illustrates a schematic block diagram of an exemplary computing environment 1230, in accordance with an embodiment of the invention. The system 1200 includes one or more client(s) 1210. The client(s) 1210 can be hardware and/or software (e.g., threads, processes, computing devices). The system 1200 also includes one or more server(s) 1220. Thus, system 1200 can correspond to a two-tier client server model or a multi-tier model (e.g., client, middle tier server, data server), amongst other models. The server(s) 1220 can also be hardware and/or software (e.g., threads, processes, computing devices). The servers 1220 can house threads to perform transformations by employing the subject innovation, for example. One possible communication between a client 1210 and a server 1220 may be in the form of a data packet transmitted between two or more computer processes.

The system 1200 includes a communication framework 1230 that can be employed to facilitate communications between the client(s) 1210 and the server(s) 1220. The client(s) 1210 are operatively connected to one or more client data store(s) 1240 that can be employed to store information local to the client(s) 1210. Similarly, the server(s) 1220 are operatively connected to one or more server data store(s) 1250 that can be employed to store information local to the servers 1220.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art should recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. A system comprising:
    a processor;
    a memory coupled to the processor, the memory storing components including:
        a recovery log component that temporarily stores timestamp information of a transaction in a commit record of the transaction, the timestamp information including an identification of the transaction, a timestamp of the transaction, and reference count data of the transaction, wherein the commit record of the transaction is included in a recovery log;
        a volatile reference count component that updates reference count data of the transaction in a volatile timestamp table to reflect a number of records of the transaction that do not persistently include timestamp information; and
        a checkpoint component that updates timestamp information for a batch of transactions from the commit record to a persistent timestamp table, wherein the timestamp information is updated in records of the persistent timestamp table for the batch of transactions to ensure that the timestamp information persists in the records of the persistent timestamp table before the commit records of the transactions that contains the timestamp information of the transactions are deleted from the recovery log,
    wherein the recovery log component rebuilds the volatile timestamp table from the commit record and any other commit records in the event of a system crash.

2. The system of claim 1, wherein the volatile reference count component maps the reference count data of the transaction, which identifies how many records updated by a transaction are not yet persistently timestamped, to the identification of the transaction and the timestamp of the transaction in the volatile timestamp table by:
    incrementing the reference count data of the transaction to reflect a number of records of the transaction that do not persistently include timestamp information; and
    decrementing the reference count data of the transaction when a record of the transaction persistently includes timestamp information.

3. The system of claim 2, wherein the volatile reference count component maintains with each page in a database cache a reference count for each transaction, wherein the reference count for each transaction indicates how many records updated by a transaction, on one or more pages in the database cache, were timestamped during the time that the one or more pages in the database cache were in the database cache since the last flush of the one or more pages to a persistent medium.

4. The system of claim 3, wherein the volatile reference count component further comprises:
    incrementing the reference count for each transaction when a record of the each transaction is associated with a page in a main memory database cache, wherein the record of the each transaction was timestamped during a time the page was in the main memory database cache, and wherein the volatile reference count component received acknowledgement that the page was written to a disk; and
    subtracting the reference count for the each transaction associated with the page in the main memory database cache from the reference count data maintained in the volatile timestamp table.

5. The system of claim 3, wherein the volatile reference count component removes an entry from the volatile timestamp table when a reference count associated with the entry becomes zero and the transaction associated with the entry has not had a record of the transaction written to the persistent timestamp table.

6. The system of claim 1, wherein the checkpoint component maps an identification of a specific transaction of the batch of transactions to a timestamp of the specific transaction and the specific transaction's reference count in an entry of the persistent timestamp table.

7. The system of claim 6, wherein the checkpoint component further comprises a batch component that updates the persistent timestamp table during every checkpoint cycle.

8. The system of claim 7, wherein the batch component further comprises:
    updating the persistent timestamp table by at least one of:
        adding a persistent timestamp table entry associated with the specific transaction of the batch of transactions, the specific transaction associated with at least one record that does not persistently contain timestamp information when a new redo scan start point associated with a current checkpoint cycle will result in the commit record of the specific transaction being truncated from the recovery log;
        removing a persistent timestamp table entry associated with the specific transaction, wherein all records of the transaction persistently contain timestamp information and a record for the specific transaction has been previously written to the persistent timestamp table; or
        removing a volatile timestamp table entry associated with the specific transaction when all records of the specific transaction persistently contain timestamp information and there is no record for the specific transaction in the persistent timestamp table.

9. The system of claim 8, wherein the batch component updates the persistent timestamp table before a checkpoint redo scan point is advanced.

10. The system of claim 1, wherein the volatile reference count component further comprises:
    storing an active portion of the persistent timestamp table in the volatile timestamp table, wherein the volatile reference count component maps an identification of the transaction to a timestamp of the transaction in the active portion of the persistent timestamp table stored in the volatile timestamp table.

11. The system of claim 1, wherein the volatile reference count component further comprises:
  maintaining page reference count data of a transaction associated with a page in a main memory database cache, wherein the page comprises one or more records of the transaction that have not been timestamped; and
  incrementing the page reference count data of the transaction for each of the one or more records of the transaction that have been timestamped since the page was last flushed to disk.

12. A computer-readable storage medium comprising computer-executable instructions stored on the computer-readable storage medium for performing operations including:
  temporarily storing timestamp information of a transaction in a commit record of the transaction, the timestamp information including an identification of the transaction, a timestamp of the transaction, and reference count data of the transaction, wherein the commit record of the transaction is included in a recovery log;
  updating reference count data of the transaction in a volatile timestamp table to reflect a number of records of the transaction that do not persistently include timestamp information;
  rebuilding the volatile timestamp table from the commit record and any other commit records included in the recovery log in the event of a system crash; and
  updating timestamp information for a batch of transactions from the commit records of the batch of transactions to a persistent timestamp table, wherein the timestamp information is updated in records of the persistent timestamp table to ensure that the timestamp information persists in the records of the persistent timestamp table before the commit records of the transactions that contains the timestamp information of the transactions are deleted from the recovery log.

13. The computer-readable storage medium of claim 12, the operations further comprising:
  mapping the reference count data of the transaction, which identifies how many records updated by the transaction are not yet persistently timestamped, to the identification of the transaction and the timestamp of the transaction in the volatile timestamp table by:
  incrementing the reference count data of the transaction to reflect a number of records of the transaction that do not include persistent timestamp information; and
  decrementing the reference count data of the transaction when a record of the transaction includes persistent timestamp information.

14. The computer-readable storage medium of claim 13, the operations further comprising:
  maintaining with each page in a database cache a reference count for each transaction, wherein the reference count for each transaction indicates how many records updated by a transaction, on one or more pages in the database cache, were timestamped during the time that the one or more pages in the database cache were in the database cache since the last flush of the one or more pages to a persistent medium.

15. The computer-readable storage medium of claim 14, the operations further comprising:
  incrementing the reference count for each transaction when a record of the each transaction is associated with a page in a main memory database cache, wherein the record of the each transaction was timestamped during a time the page was in the main memory database cache, and wherein the volatile reference count component received acknowledgement that the page was written to a disk;
  subtracting the reference count for the each transaction associated with the page in the main memory database cache from the reference count data maintained in the volatile timestamp table; and
  removing an entry from the volatile timestamp table when a reference count associated with the entry becomes zero and the transaction associated with the entry has not had a record of the transaction written to the persistent timestamp table.

16. The computer-readable storage medium of claim 15, the operations further comprising:
  timestamping record versions transmitted to a historical page during a timesplit process; and
  timestamping all committed record versions of a page when flushing the page to a disk.

17. The computer-readable storage medium of claim 12, the operations further comprising:
  mapping an identification of a specific transaction of the batch of transactions to a timestamp of the specific transaction and the specific transaction's reference count in an entry of the persistent timestamp table;
  updating the persistent timestamp table during every checkpoint cycle; and
  updating the persistent timestamp table by at least one of:
  adding a persistent timestamp table entry associated with the specific transaction, the specific transaction associated with at least one record that does not persistently contain timestamp information when a new redo scan start point associated with a current checkpoint cycle will result in the commit record of the specific transaction being truncated from the recovery log;
  removing a persistent timestamp table entry associated with the specific transaction, wherein all records of the specific transaction persistently contain timestamp information and a record for the specific transaction has been previously written to the persistent timestamp table; or
  removing a volatile timestamp table entry associated with the specific transaction when all records of the specific transaction persistently contain timestamp information and there is no record for the specific transaction in the persistent timestamp table.

18. The computer-readable storage medium of claim 17, the operations further comprising at least one of:
  updating the persistent timestamp table before a checkpoint redo scan point is advanced;
  storing an active portion of the persistent timestamp table in the volatile timestamp table, wherein the volatile reference count component maps an identification of the specific transaction to a timestamp of the specific transaction in the active portion of the persistent timestamp table stored in the volatile timestamp table;
  maintaining page reference count data of a transaction associated with a page in a main memory database cache, wherein the page comprises one or more records of the specific transaction that have not been timestamped; or
  incrementing the page reference count data of the specific transaction for each of the one or more records of the specific transaction that have been timestamped since the page was last flushed to disk.

19. A method comprising:
  under control of one or more processors executing computer-executable instructions:

temporarily storing timestamp information of a transaction in a commit record of the transaction, the timestamp information including an identification of the transaction, a timestamp of the transaction, and reference count data of the transaction, wherein the commit record of the transaction is included in a recovery log;

updating reference count data of the transaction in a volatile timestamp table to reflect a number of records of a transaction that do not persistently include timestamp information;

rebuilding the volatile timestamp table from the commit record and any other commit records included in the recovery log in the event of a system crash; and updating timestamp information for a batch of transactions from the commit records for the batch of transactions to a persistent timestamp table, wherein the timestamp information is updated in the records of the persistent timestamp table to ensure that the timestamp information persists in the records of the persistent timestamp table before the commit records of the transactions that contains the timestamp information for the transactions are deleted from the recovery log.

* * * * *